US012043274B2

(12) United States Patent
Isaac

(10) Patent No.: US 12,043,274 B2
(45) Date of Patent: Jul. 23, 2024

(54) AUTONOMOUS DRIVING ALGORITHM EVALUATION AND IMPLEMENTATION

(71) Applicant: Allstate Insurance Company, Northbrook, IL (US)

(72) Inventor: Emad Isaac, Downers Grove, IL (US)

(73) Assignee: ALLSTATE INSURANCE COMPANY, Northbrook, IL (US)

( * ) Notice: Subject to any disclaimer, the term of this patent is extended or adjusted under 35 U.S.C. 154(b) by 486 days.

(21) Appl. No.: 17/001,209

(22) Filed: Aug. 24, 2020

(65) Prior Publication Data
US 2022/0055639 A1 Feb. 24, 2022

(51) Int. Cl.
*B60W 50/08* (2020.01)
*B60W 50/04* (2006.01)
*B60W 50/00* (2006.01)

(52) U.S. Cl.
CPC ........ *B60W 50/085* (2013.01); *B60W 50/045* (2013.01); *B60W 2050/0075* (2013.01);
(Continued)

(58) Field of Classification Search
CPC .. B60W 50/08; B60W 50/082; B60W 50/085; B60W 50/087; B60W 50/10;
(Continued)

(56) References Cited

U.S. PATENT DOCUMENTS 8,781,669 B1 7/2014 Teller et al.
9,632,502 B1 4/2017 Levinson et al.
(Continued)

FOREIGN PATENT DOCUMENTS

WO WO-2019234726 A1 12/2019

OTHER PUBLICATIONS

Waymo, et al., "GM and Ford Pegged as Autonomous "Leaders" by Latest Navigant Report," Mar. 13, 2019, <https://www.sae.org/news/2019/03/2019-navigant-autonomous-leaderboard> 2 pages.
(Continued)

*Primary Examiner* — Russell Frejd
*Assistant Examiner* — Sara J Lewandroski
(74) *Attorney, Agent, or Firm* — Akerman LLP

(57) ABSTRACT

Methods and systems for autonomous driving algorithm evaluation are described herein. A computing device may receive, via telematics sensors associated with a vehicle, telematics data corresponding to one or more trips taken by the vehicle during a period of time. Portions of the telematics data corresponding to use of an autonomous driving algorithm may be determined. One or more performance metrics of the autonomous driving algorithm may be determined based on the portions of the telematics data corresponding to use of the autonomous driving algorithm. The one or more performance metrics may be compared to one or more other performance metrics, such as those corresponding to other autonomous driving algorithms. An autonomous vehicle score may be assigned to the autonomous driving algorithm. Based on the autonomous vehicle score, an indication of a second autonomous driving algorithm may be sent to the vehicle.

17 Claims, 4 Drawing Sheets

(52) U.S. Cl.
CPC . *B60W 2050/0085* (2013.01); *B60W 2556/10* (2020.02); *B60W 2556/55* (2020.02)

(58) Field of Classification Search
CPC ...... B60W 50/12; B60W 50/14; B60W 50/16; B60W 2050/143; B60W 60/0015; B60W 60/0018; B60W 60/00182; B60W 60/0054; B60W 60/0055; B60W 60/0059; G07C 5/00; G07C 5/006; G07C 5/008; G07C 5/02; G07C 5/04; G07C 5/06; G07C 5/08; G07C 5/0808; G07C 5/0816; G07C 5/0825; G07C 5/0833; G07C 5/0841; G07C 5/085; G07C 5/0858; G07C 5/0866; G07C 5/0875; G07C 5/0883; G07C 5/0891; G07C 5/10; G07C 5/12

See application file for complete search history.

(56) References Cited

U.S. PATENT DOCUMENTS

| | | |
|---|---|---|
| 9,650,051 B2 | 5/2017 | Hoye et al. |
| 9,728,084 B2 | 8/2017 | Stenneth |
| 9,940,676 B1 | 4/2018 | Biemer |
| 9,963,106 B1 | 5/2018 | Ricci |
| 10,198,772 B2 | 2/2019 | Parameshwaran |
| 10,239,538 B1 | 3/2019 | Fields et al. |
| 10,380,693 B2 | 8/2019 | Suiter |
| 10,417,910 B2 | 9/2019 | Scofield et al. |
| 10,460,394 B2 | 10/2019 | Perl et al. |
| 10,467,824 B2 | 11/2019 | Rosenbaum |
| 10,475,127 B1 | 11/2019 | Potter et al. |
| 10,520,947 B2 | 12/2019 | Liu et al. |
| 10,579,070 B1 | 3/2020 | Konrardy et al. |
| 10,599,155 B1 | 3/2020 | Konrardy et al. |
| 2015/0170287 A1 | 6/2015 | Tirone et al. |
| 2015/0187019 A1 | 7/2015 | Fernandes et al. |
| 2018/0075380 A1 | 3/2018 | Perl et al. |
| 2018/0113460 A1 | 4/2018 | Koda et al. |
| 2018/0217603 A1 | 8/2018 | Kwon et al. |
| 2018/0342033 A1* | 11/2018 | Kislovskiy ......... G01C 21/3697 |
| 2019/0052522 A1* | 2/2019 | Makkiya ............... H04L 41/069 |
| 2019/0212749 A1 | 7/2019 | Chen et al. |
| 2019/0311559 A1* | 10/2019 | Bigio ................... G07C 5/0841 |
| 2020/0041994 A1 | 2/2020 | Alalao et al. |
| 2020/0387156 A1* | 12/2020 | Xu ...................... G05B 13/0265 |
| 2021/0024058 A1* | 1/2021 | Balakrishnan ........ B60W 30/09 |
| 2021/0237772 A1* | 8/2021 | Meltz ...................... G06F 30/20 |
| 2021/0387650 A1* | 12/2021 | Li ..................... B60W 60/0053 |

OTHER PUBLICATIONS

Radovanovic, et al., "This is what the evolution of self-driving cars looks like," Oct. 4, 2016, <https://www.businessinsider.com/what-are-the-different-levels-of-driverless-cars-2016-10?IR=T>, 8 pages.
International Search Report and Written Opinion of the International Searching Authority for PCT/US2021/041300 Dated Oct. 5, 2021 (9 Pages).

* cited by examiner

AUTONOMOUS DRIVING ALGORITHM EVALUATION AND IMPLEMENTATION

FIELD

Aspects described herein generally relate to autonomous driving algorithms, telemetric devices and telemetry, automobile safety, and hardware and software related thereto. More specifically, one or more aspects described herein provide for analyzing and responding to the performance of autonomous driving algorithms in automobiles.

BACKGROUND

Many vehicles implement or execute one or more autonomous driving algorithms. Such autonomous driving algorithms range widely in terms of the degree of autonomous driving they provide. For example, simplistic autonomous driving systems may help keep a vehicle in its lane while driving and/or may aid a vehicle in remaining no closer than a predetermined distance from another vehicle. Other autonomous driving algorithms, for example, purport to provide completely hands-free autonomous driving, handling everything from stopping at a stop light to parking in a parking spot. Such autonomous driving algorithms may execute on one or more computing devices in a vehicle and may be periodically updated and/or replaced by the manufacturer of the vehicle.

The safety and efficacy of autonomous driving algorithms may vary. For example, a lane-keeping algorithm may be relatively simplistic as compared to a different algorithm which purports to handle all aspects of driving, but the former algorithm may ultimately be safer in operation than the latter. As another example, two autonomous driving algorithms may purport to handle nearly all aspects of driving tasks; however, one may perform better in snowy conditions than the other. That said, the diversity and complexity of these algorithms can render comparison of one algorithm against another algorithm prohibitively difficult. As such, it can be difficult to ascertain when, for example, it may be safer to use one algorithm as compared to another in the same vehicle. Moreover, it can be difficult to determine circumstances where a single autonomous driving algorithm is more unsafe than the combination of two different autonomous driving algorithms executing in the same vehicle.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards analyzing and responding to the performance of different autonomous driving algorithms.

A computing device may receive, via telematics sensors associated with a vehicle, telematics data. Such telematics data may comprise data captured by one or more sensors in a vehicle and may correspond to the vehicle's operation or performance. The telematics data may additionally and/or alternatively correspond to one or more trips taken by the vehicle during a period of time. The telematics data may comprise, for example, information from in-vehicle accelerometers (corresponding to instances of braking and acceleration), information from various in-vehicle computers (e.g., as received via an on-board diagnostics (OBD) port, such as an OBDII port), and the like. Such telematics data may comprise data relating to periods when the vehicle was being operated by a driver and periods when the vehicle was being operated, in whole or in part, by one or more autonomous driving algorithms (e.g., autonomous or semi-autonomous driving mode). The computing device may determine one or more subsets of the period of time based on determining that, during the one or more subsets of the period of time, the vehicle used or executed an autonomous driving algorithm to perform one or more driving operations. The computing device may determine one or more performance metrics of the autonomous driving algorithm by analyzing one or more portions of the telematics data corresponding to the one or more subsets of the period of time. The one or more performance metrics may relate to, for example, safety and/or risk associated with operation of the autonomous driving algorithm. The one or more performance metrics may, for example, comprise a subjective evaluation of the skill of the autonomous driving algorithm in responding to certain events (e.g., being cut off in traffic) and/or in certain circumstances (e.g., driving at night in the rain). The one or more performance metrics may be compared to one or more other performance metrics associated with one or more different autonomous driving algorithms. For example, a performance metric may be compared to performance metrics associated with a safe driver, an ideal autonomous driving algorithm, a best-in-class available autonomous driving algorithm, or the like. As another example, a performance metric may be compared to another performance metric that is based on a second subset of the telematics data corresponding to times when the autonomous driving algorithm was not used or executed to perform one or more driving operations (e.g., non-autonomous driving mode). An autonomous vehicle score may be assigned, based on the comparing, to the autonomous driving algorithm. This autonomous vehicle score may comprise an objective or subjective evaluation of the performance of the autonomous driving algorithm. Such an autonomous vehicle score might be assigned relative to other autonomous driving algorithms such that, for example, one autonomous driving algorithm may have a better score than another based on its ability to drive in a safer manner Such an autonomous vehicle score might be useful for a variety of purposes, including for insurance purposes: for example, an insurance premium may be modified based on the autonomous vehicle score assigned to an autonomous driving algorithm. Additionally and/or alternatively, the insurance premium might be set based on all or portions of the performance metrics. Based on determining that the autonomous vehicle score satisfies a threshold (e.g., is too low), an indication of one or more second autonomous driving algorithms (e.g., one that has a greater autonomous vehicle score as compared to the autonomous driving algorithm) may be sent to the vehicle. The indication may cause the vehicle to replace the autonomous driving algorithm with the one or more second autonomous driving algorithms (e.g., execute the one or more second autonomous driving algorithms instead of the autonomous driving algorithm). Additionally and/or alternatively, an indication may be sent as to whether performance of the autonomous driving algorithm deviates from marketed performance capabilities of the autonomous driving algorithm.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1:
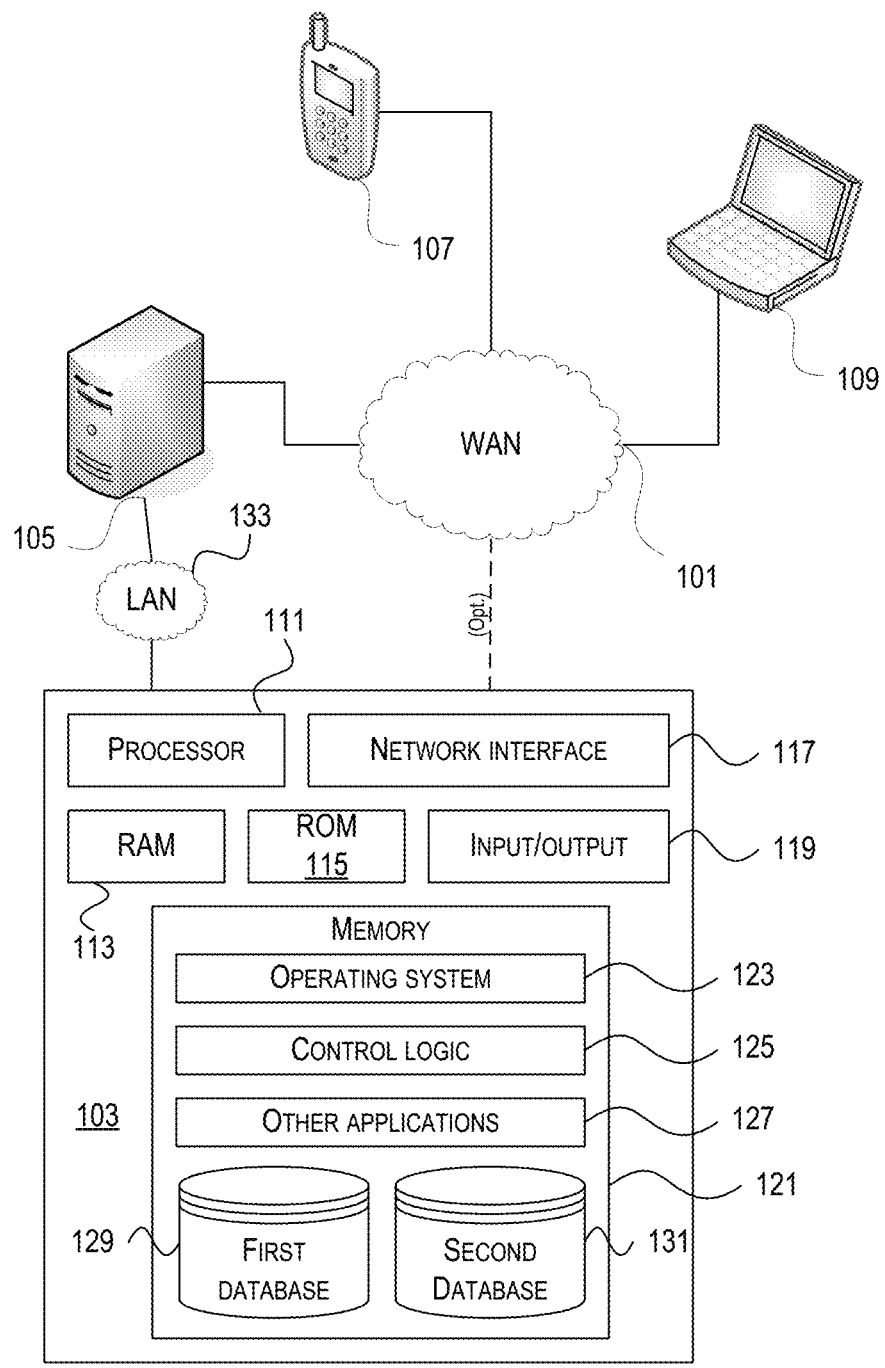
FIG. 1 depicts an illustrative computer system architecture that may be used in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction, aspects described herein are directed towards evaluating and responding to the performance of autonomous driving algorithms in a manner which, among other things, improves the safety of vehicle operations. The wide variety of autonomous driving algorithms can make evaluation of the performance of those algorithms in different circumstances quite difficult. For example, it is not easy to ascertain whether a lane-keeping algorithm operating in conjunction with human input is, in some circumstances (e.g., a rainy night), safer than an autonomous driving algorithm that purports to avoid crashes. By evaluating telematics data in view of when autonomous driving algorithms are operational, performance metrics of autonomous driving algorithms may be determined. For example, such telematics data may be used to evaluate the propensity of a given autonomous driving algorithm to perform hard braking. In turn, analysis of those performance metrics as compared to other performance metrics (e.g., those corresponding to other autonomous driving algorithms) may indicate strengths and weaknesses of different autonomous driving algorithms. This method advantageously evaluates autonomous driving algorithms based on their actual performance and using actual drivers, rather than evaluating the algorithms via simulation or using professional drivers. Where an autonomous driving algorithm is not performing in a desired fashion (e.g., an autonomous vehicle score assigned to the autonomous driving algorithm is lower than a predetermined safety threshold), a vehicle may be prompted to install or execute one or more different autonomous driving algorithms which may be associated with a greater level of safety as compared to the autonomous driving algorithm. Additionally and/or alternatively, such an autonomous vehicle score may be used to set an insurance rate (e.g., an insurance premium) for the vehicle, such that the rate reflects risk and/or safety of the autonomous driving algorithm. For example, if it is determined that a first autonomous driving algorithm promising nearly hands-free driving is unsafe, vehicles with that algorithm may be prompted to install or execute a safer second autonomous driving algorithm, even if the second autonomous driving algorithm offers fewer features than the first autonomous driving algorithm. As another example, a driver of the vehicle may be informed of the performance, such that they might operate the vehicle more safely: for example, a message may be sent to the vehicle indicating that operation of an autonomous driving algorithm at night is undesirable because the algorithm is prone to error in dark conditions.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect connecting, coupling, and the like.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 (which may additionally and/or alternatively be referred to as computing devices) may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of computer, server, or data processing device configured to perform the functions described herein. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
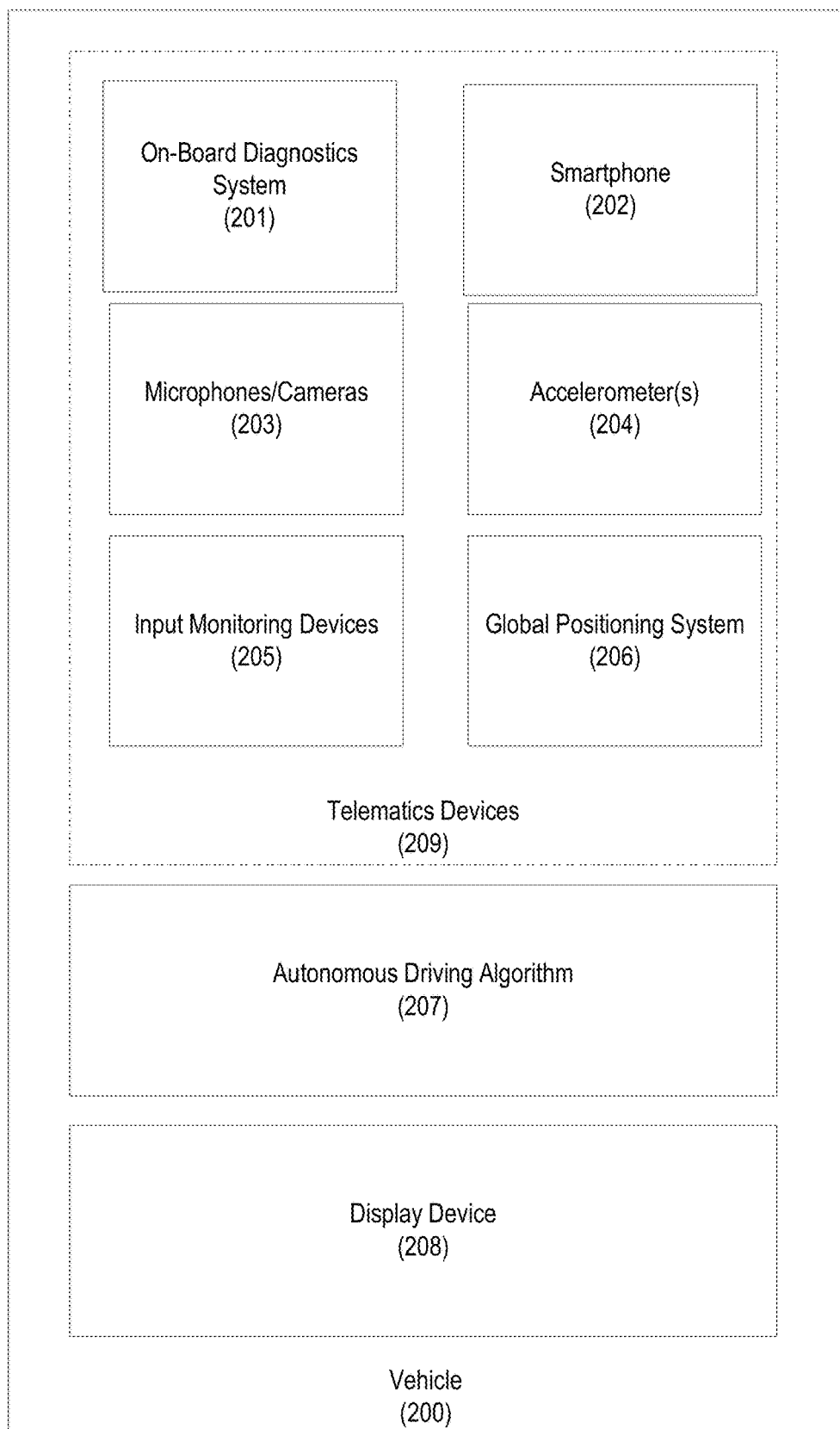
FIG. 2 depicts an autonomous driving algorithm, a plurality of telematics devices, and a display device which may be located in a vehicle in accordance with one or more aspects described herein.

FIG. 2 depicts schematic representation of an example vehicle 200 with telematics devices 209, including an on-board diagnostics system 201, a smartphone 202, microphones/cameras 203, accelerometer(s) 204, input monitoring devices 205, and global positioning system 206. The vehicle 200 is also shown with an autonomous driving algorithm 207 and a display device 208. The on-board diagnostics system 201, the smartphone 202, the microphones/cameras 203, the accelerometers 204, the input monitoring devices 205, and the global positioning system 206 may collectively or in any combination be referred to as telematics devices 209. The telematics devices 209 shown in the vehicle 200 are illustrative, and any combination of telematics devices may be implemented. For example, the accelerometer(s) 204 may be replaced with any type of telemetric device which detects the motion of the vehicle 200. As another example, the microphones/cameras 203 may be omitted. All or portions of the telematics devices 209 may be all or portions of the network nodes 103, 105, 107, and 109. Additionally and/or alternatively, all or portions of the telematics devices 209 may be communicatively coupled to any of the computing devices and/or servers discussed with respect to FIG. 1. For example, the smartphone 202 may be communicatively coupled to the microphones/cameras 203 and/or may comprise the microphones/cameras 203.

The on-board diagnostics system 201 may be one or more systems used by the vehicle 200 to monitor operation of the vehicle 200. The on-board diagnostics system 201 may monitor, for example, tire pressure, fuel levels, oil levels and/or health, electrical system performance, powertrain data, emissions-related data, vehicle identification data, vehicle speed, seat belt usage, headlight usage, windshield wiper usage, or the like. The on-board diagnostics system 201 may thus pertain to virtually any aspect of the operation of the vehicle 200. Data may be retrieved from the on-board diagnostics system 201 via an interface, such as an OBDII port.

The smartphone 202 may be associated with an individual, such as a driver of the vehicle 200. The smartphone 202 may comprise one or more motion sensors, such as an accelerometer, which may be used to monitor operation of the vehicle 200. For example, the smartphone 202 may be configured to record acceleration of the vehicle 200 while the smartphone 202 is located inside the vehicle 200. The smartphone 202 may advantageously allow for the collection of telematics data from the vehicle 200 in circumstances where the vehicle 200 is not otherwise equipped to collect such data. For example, if the vehicle 200 is a motorcycle, the smartphone 202 may use all of its sensors (including, for example, the microphones/cameras 203, the accelerometer (s) 204, or the like) to collect telematics data.

The microphones/cameras 203 may be used to collect video and/or audio information associated with operation of the vehicle 200. For example, the microphones/cameras 203 may be configured to record audio outside of or inside the vehicle, whether as part of a telephone call by a driver and/or to detect events (e.g., crashes) which may implicate the safety of the vehicle 200. Similarly, the microphones/cameras 203 may be configured to record video outside of or inside the vehicle to, for example, track the location of other vehicles outside of the vehicle 200, determine the number of passengers inside the vehicle 200, or the like. For example, the microphones/cameras 203 may be able to track how close the vehicle 200 is to other vehicles on the road.

The accelerometer(s) 204 may be used to determine the acceleration of the vehicle 200. For example, the accelerometer(s) 204 may be configured to determine when the vehicle 200 is accelerated abruptly, brakes hard, turns sharply, or the like. The accelerometer(s) 204 may be configured to measure both a direction and intensity of acceleration, such that the accelerometer(s) 204 may be configured to determine the intensity with which the vehicle 200 accelerates or decelerates in a particular direction.

The input monitoring devices 205 may be configured to monitor user input with respect to the vehicle 200. Such user input may comprise, for example, turning the steering wheel, using any pedals (including a clutch pedal), use of vehicle entertainment systems, or the like. The input monitoring devices 205 may thereby be configured to determine whether a user is driving the vehicle 200, is present in the vehicle 200, or the like. For example, if the vehicle 200 is in motion and the steering wheel of the vehicle 200 is not moving, this may indicate operation of the autonomous driving algorithm 207. The input monitoring devices 205 may communicate such information via the on-board diagnostics system 201.

The global positioning system 206 may be comprised to determine a location of the vehicle. Additionally and/or alternatively, the global positioning system 206 (or other sensors, such as the on-board diagnostics 201) may be configured to determine current lighting and/or weather conditions. The global positioning system 206 may be used to determine, for example, whether the vehicle 200 is on a highway, a back road, or the like. As discussed below, such information may be useful in that it indicates circumstances in which the autonomous driving algorithm 207 is operating.

The autonomous driving algorithm 207 may be any application, system, and/or combination of systems which may operate to perform one or more driving tasks associated with the vehicle 200. The autonomous driving algorithm 207 may, for example, operate to keep the vehicle 200 in its lane during driving, keep the vehicle 200 from hitting the back of other vehicles in front of the vehicle 200, and/or prevent a driver of the vehicle from steering into another vehicle located in a blind spot of the vehicle 200. The autonomous driving algorithm 207 may have multiple routines and/or subroutines. For example, the autonomous driving algorithm 207 may assist in two different driving tasks (e.g., accelerating and braking as part of a cruise control algorithm).

Autonomous driving algorithms, such as the autonomous driving algorithm 207, may be categorized into one of six different levels defined by the Society of Automotive Engineers. Level 0 driving may correspond to no autonomous driving whatsoever, though some systems may exist to aid the driver during the driving task. Level 1 may correspond to a single automated system for driver assistance, such as steering and/or accelerating (such as in the case of cruise control). Level 2 may correspond to partial automation, such as where the vehicle may perform some tasks as monitored by a driver. Level 3 may correspond to conditional automation, where the autonomous driving algorithm 207 may handle most tasks until taken over by a user. Level 4 may correspond to high automation, where the vehicle performs all driving tasks under certain circumstances (e.g., in a specific location as determined by the global positioning system 206), but driver override is still available. Level 5 may correspond to full automation, where no human involvement is involved. Autonomous driving algorithms, such as the autonomous driving algorithm 207, may be marketed as being one or more of these levels in different circumstances. That said, the marketing of these algorithms does not necessarily guarantee that the autonomous driving algorithm 207 is capable of performing these tasks as expected in all circumstances. Stated differently, different levels of autonomous driving algorithms may perform more autonomous driving tasks and may thereby assume more risk during operation, but this does not necessarily mean that the algorithms perform such tasks perfectly. For example, two different autonomous driving algorithms may be classified as Level 5 because it handles all aspects of the driving task, but one algorithm might be configured to gently and comfortably brake at a stop sign, whereas the other might be less desirable in that it may be configured to suddenly brake at stop signs. As such, the mere classification of an autonomous driving algorithm with a particular level does not necessarily suggest that the autonomous driving algorithm performs driving tasks safely or well.

The vehicle 200 may replace the autonomous driving algorithm 207 with another autonomous driving algorithm. For example, the vehicle 200 may receive, from a server, a new version of the autonomous driving algorithm 207 and install or execute the new version of the autonomous driving algorithm 207 as a replacement of an older version of the autonomous driving algorithm 207. Additionally and/or alternatively, one or more second autonomous driving algorithms may replace the autonomous driving algorithm 207. For example, the autonomous driving algorithm 207 may be replaced with two separate autonomous driving algorithms which each perform different driving tasks and that, collectively, operate in a safer manner than the autonomous driving algorithm 207. As another example, based on an autonomous vehicle score assigned to the autonomous driving algorithm 207, it may be replaced with a second autonomous driving algorithm that is associated with a better autonomous vehicle score.

The display device 208 may be configured to display content to a driver and/or other passengers of the vehicle

200. For example, the display device 208 may display a map based on information from the global positioning system 206. The display device 208 may also be configured to display information associated with the autonomous driving algorithm 207, such as an operational status of the autonomous driving algorithm 207. Additionally and/or alternatively, the display device 208 may be configured to display messages received from one or more computing devices. For example, the display device 208 may be configured to display a message indicating that a new version of the autonomous driving algorithm 207 is available to download and install. In yet another example, the display device 208 may be configured to display an autonomous vehicle score associated with the autonomous driving algorithm 207.

Figure 3:
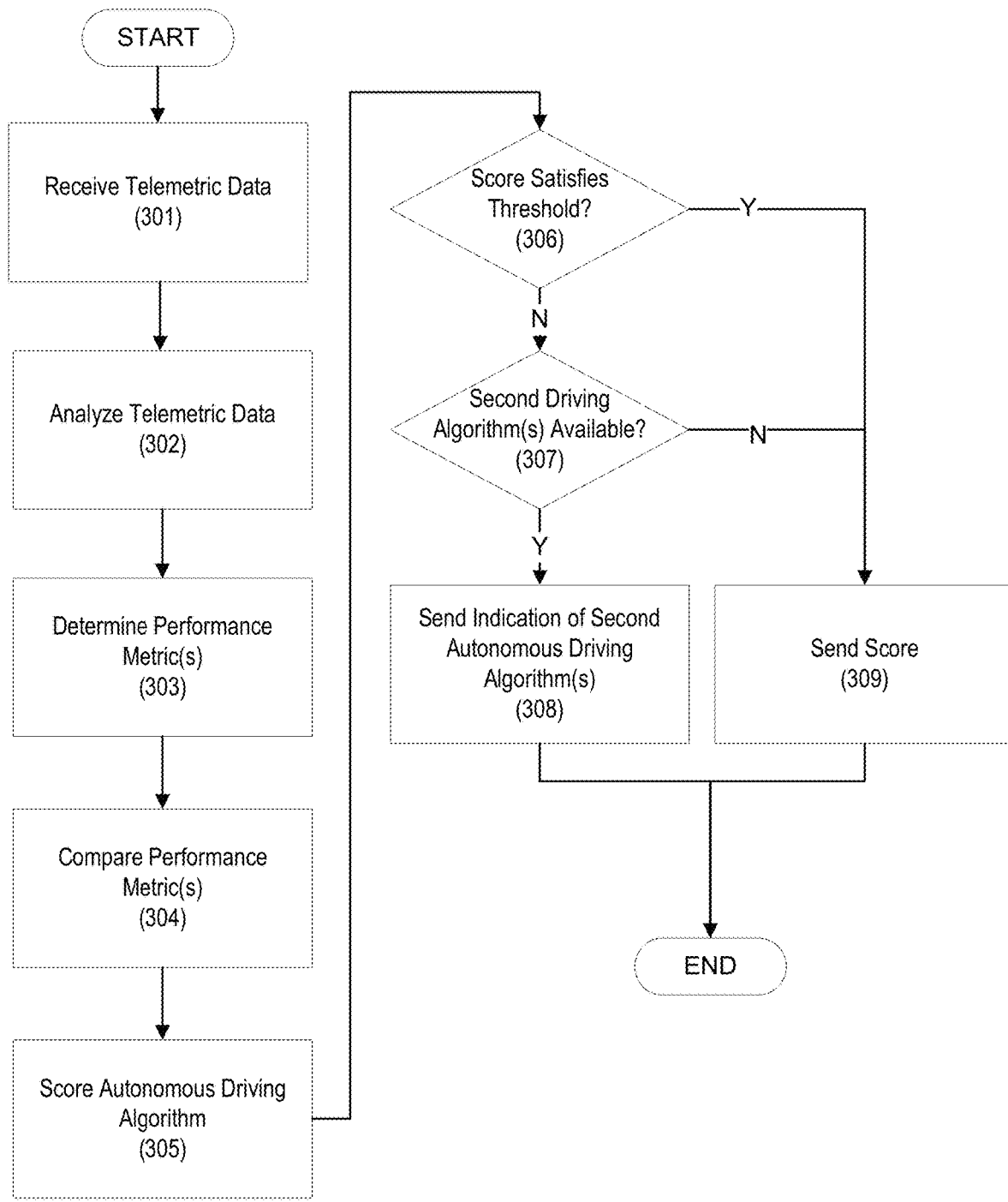
FIG. 3 depicts an example flow chart with steps which may be performed to evaluate the performance of an autonomous driving algorithm in accordance with one or more aspects described herein.

FIG. 3 is a flow chart depicting example steps which may be performed, by a computing device, to analyze and respond to the performance of an autonomous driving algorithm, such as the autonomous driving algorithm 207, in accordance with one or more aspects described herein. The computing device performing the steps depicted in FIG. 3 may comprise, for example, a server remote from a vehicle such as the vehicle 200 (e.g., any one of the servers discussed in FIG. 1), the smartphone 202 (whether or not in the vehicle 200), an on-board vehicle computing device, or any other computing device. The computing device may be any one of the network nodes 103, 105, 107, and 109 and/or may comprise one or more processors and memory storing instructions that, when executed by the one or more processors, cause performance of all or some of the steps depicted in FIG. 3. The steps depicted in FIG. 3 are illustrative, and may be rearranged or omitted as desired.

In step 301, telematics data may be received. The telematics data may be received from the telemetric devices discussed in FIG. 2. The telematics data may comprise information about telemetry of a vehicle, such as the vehicle 200, over one or more periods of time. During some portions of the one or more periods of time, a vehicle may have been driven by a driver. During other portions of the one or more periods of time, a vehicle may have been under partial or total control by an autonomous driving algorithm (e.g., operating in semi-autonomous or autonomous driving mode), such as the autonomous driving algorithm 207. The telematics data 302 may be received in a variety of ways, such as over a network such as the WAN 101. The telematics data 302 may be received on a periodic basis, such as on a weekly basis.

Telematics data may be in any format desired. Telematics data may comprise a series of timestamps with corresponding data indicating the operations of the vehicle 200. For example, telematics data may comprise a timestamped set of data indicating readings from one or more accelerometers, indications of whether user input devices of the vehicle 200 were in use, information about the location of the vehicle 200 and weather conditions around the vehicle 200, and the like.

As discussed with respect to FIG. 2, a smartphone, such as the smartphone 202, may be used to collect all or some of the telematics data. This may advantageously allow the collection of all or portions of the telematics data where other telemetric devices, such as the on-board diagnostics 201 and/or the input monitoring devices 205, might not be available. For example, an accelerometer of the smartphone 202 may be used instead of and/or in conjunction with the accelerometers 204.

In step 302, the telematics data may be analyzed. One or more first portions of the telematics data corresponding to one or more periods when the vehicle 200 was subject to human input may be determined. This may comprise, for example, determining one or more first portions of the telematics data which indicate human input via one or more controls of the vehicle as determined via data from the input monitoring devices 205. One or more second portions of the telematics data corresponding to one or more periods when the vehicle 200 was under control of an autonomous driving algorithm, such as the autonomous driving algorithm 207, may be determined. In this manner, the telematics data may be separated such that telematics data corresponding to human input (e.g., a few seconds when the user steered the vehicle) may be separated from telematics data corresponding to operation of an autonomous driving algorithm (e.g., a minute when the vehicle 200 was subject to a cruise control algorithm).

Determining which portions of the telematics data correspond to human input may be based on data retrieved from the input monitoring devices 205 and/or the on-board diagnostics system 201. For example, the telematics data may comprise an indication of steering wheel movement and/or pedal use during motion of the vehicle 200, which may be used to determine periods of time when the vehicle 200 is being operated by a driver. If the telematics data received does not indicate when the autonomous driving algorithm 207 is being used, such periods may be inferred based on periods when the telematics data does not indicate human input. For example, if the accelerometer(s) 204 and/or accelerometers of the smartphone 202 indicate that the vehicle 200 is turning but the input monitoring devices 205 do not indicate that the steering wheel of the vehicle 200 is turning, this may indicate the operation of the autonomous driving algorithm 207.

In step 303, one or more performance metrics may be determined based on the telematics data. First performance metrics may be determined based on the portions of the telematics data corresponding to human input, and second performance metrics may be determined based on the portions of the telematics data corresponding to operation of an autonomous driving algorithm such as the autonomous driving algorithm 207. The performance metrics may comprise objective and/or subjective evaluations of the driving of the vehicle 200. For example, a performance metric may correspond to whether or not a driver or autonomous driving algorithm is prone to hard braking (e.g., number of hard braking occurrences in a predetermined time period), sudden acceleration (e.g., acceleration over a predetermined distance), hard turns, swerving, wheel slippage, revving an engine of the vehicle 200 close to its redline, or the like. The performance metrics may thereby provide detail as to the overall objective and/or subjective performance of a driver and/or autonomous driving algorithm. In some embodiments, one or more of the overall objective and/or subjective performance metrics may be used to create or otherwise impact a driver score or an autonomous vehicle score.

In step 304, the performance metrics determined in step 303 may be compared to other performance metrics, which may correspond to one or more other drivers, autonomous driving algorithms, or the like. For example, the performance metrics determined in step 303 may be compared to ideal performance metrics, performance metrics corresponding to a best-in-class and/or ideal autonomous driving algorithm, performance metrics corresponding to a safe and/or average driver, performance metrics corresponding to previously identified acceptable performance, or the like. The performance metrics determined in step 303 may be determined against a plurality of different other performance metrics, and differences may be determined based on those comparisons. For example, the comparisons performed in step 304 may comprise comparing the hard braking propensity and hard acceleration propensity of the autonomous driving algorithm 207 against the hard braking propensity and hard acceleration propensity of a sample set of alternative autonomous driving algorithms.

One comparison which may be performed in step 304 is comparing performance metrics associated with autonomous operation of the vehicle 200 with performance metrics associated with operation, by a driver, of the vehicle 200. In this manner, it may be determined whether use of the autonomous driving algorithm 207 improves or worsens the safety of driving of the vehicle 200 under various circumstances. For example, it may be determined that operation of the vehicle 200 by the autonomous driving algorithm 207 is safer in most circumstances except for during a dark and rainy day, when it may be safer for a driver to control the vehicle 200.

The comparison may be based on environmental conditions of the vehicle 200. For example, the performance metrics determined in step 303 may correspond to operation of the vehicle 200 during a rainy day, and those performance metrics may be compared to performance metrics which also correspond to operation of vehicles during a rainy day. In this manner, the comparison may take into account environmental factors which may negatively or positively influence the driving performance of a driver and/or the autonomous driving algorithm 207.

The comparison may comprise comparing performance metrics corresponding to the autonomous driving algorithm 207 with an older version of the autonomous driving algorithm 207. In this manner, newly-introduced algorithm bugs, weaknesses, and/or vulnerabilities may be determined. For example, through this comparison, it may be determined that a newer version of the autonomous driving algorithm 207 performs worse in snowy conditions as compared to a previous version of the autonomous driving algorithm 207, even if other improvements to the autonomous driving algorithm 207 may have been made.

The comparison need not involve comparing performance metrics corresponding to the autonomous driving algorithm 207 with performance metrics of autonomous driving algorithms meant to be used in the same type of vehicle. For example, the autonomous driving algorithm 207 may be configured for use in a large truck, and the comparison may entail comparing the performance metrics of the autonomous driving algorithm 207 with performance metrics corresponding to an autonomous driving algorithm designed for use by small sports cars. That said, the comparison may take into account differences (e.g., in weight, horsepower, or the like) which may influence the performance metrics. For example, because a heavier vehicle may take more time to stop, it may be harder to detect hard braking events in a heavier vehicle as compared to a light vehicle.

Comparing the performance metrics determined in step 303 with other performance metrics may comprise determining a performance difference between the autonomous driving algorithm 207 and one or more other autonomous driving algorithms. For example, the performance difference may correspond to a different quantity of user input required during operation of the different autonomous driving algorithms In this manner, the comparison may indicate whether the autonomous driving algorithm 207 requires a greater degree of user involvement as compared to other autonomous driving algorithms. The performance difference may additionally and/or alternatively indicate that the autonomous driving algorithm 207 (or another autonomous driving algorithm) is safer.

Comparing the performance metrics determined in step 303 may comprise comparing the performance metrics with user performance metrics. As the performance metrics determined in step 303 correspond to one or more autonomous driving algorithms, such as the autonomous driving algorithm 207, there may be instances in which it is safer to require that a driver of a vehicle take control of the vehicle, rather than having the autonomous driving algorithm(s) control that vehicle. As such, the performance metrics may be compared to second performance metrics associated with human operation of a vehicle. The second performance metrics may be based on historical behavior of a driver (e.g., a driver that commonly drives the vehicle) or may be estimated based on the typical behavior of drivers of the vehicle. Should the difference between the performance metrics and the second performance metrics satisfy a threshold, a user may be required to take control of the vehicle, and the autonomous driving algorithm(s) (such as the autonomous driving algorithm 207) may be disabled. Additionally and/or alternatively, should the difference between the performance metrics and the second performance metrics satisfy a threshold, control of a vehicle may be provided to the autonomous driving algorithm(s) (such as the autonomous driving algorithm 207).

Additionally and/or alternatively, comparing the performance metrics determined in step 303 may comprise comparing the performance metrics to performance metrics associated with an autonomous driving level. For example, the performance metrics for a Level 3 autonomous driving algorithm may be compared to performance metrics which define a minimum level of performance for a Level 3 autonomous driving algorithm. Such a comparison may thereby aid in determining whether an autonomous driving algorithm operates in a risky manner. For example, such a comparison may reveal that an autonomous driving algorithm performs well in sunny conditions, but performs poorly at night and/or when it rains. Based on such a revelation, it may be desirable to require that users take control of a vehicle during rainy conditions, and/or an insurance premium may be adjusted based on the location of the autonomous driving algorithm (e.g., such that, if the vehicle is located in an area associated with significant rainfall, the insurance premium will be higher than if the vehicle was located in a desert region).

In step 305, the autonomous driving algorithm may be scored with an autonomous vehicle score based on the comparisons performed in step 304. The autonomous vehicle score may be a subjective and/or objective evaluation of the performance of the autonomous driving algorithm in view of the comparisons performed in step 304. Such a score may be based on vehicle telematics, input from one or more autonomous driving algorithms, third party evaluations of the performance of the autonomous driving algorithm (e.g., reviews from independent researchers), and the like. The autonomous vehicle score may be favorable if, for example, the performance metrics determined in step 303 indicate low-risk and/or safe driving (e.g., in the abstract, and/or as compared with driving performed by a human), are better than one or more other performance metrics corresponding to different autonomous driving algorithms, or the like. As another example, the autonomous vehicle score may be poor if the performance metrics determined in step 303 indicate risky and/or unsafe driving (e.g., in the abstract, and/or as compared with driving performed by a human), are worse than one or more other performance metrics corresponding to different autonomous driving algorithms, or the like. The autonomous vehicle score may be used to, for example, set an insurance rate (e.g., an insurance premium) of a vehicle that uses the autonomous driving algorithm. In this manner, the insurance rate may reflect, for example, the safety and/or risk propensity of an autonomous driving algorithm.

The autonomous vehicle score may comprise a plurality of sub-scores. One or more of the plurality of sub-scores may represent one or more factors which may be used to determine the risk or safety of the autonomous driving algorithm. As an example, one sub-score may correspond to vehicle acceleration. As another example, a sub-score may correspond to braking (e.g., the propensity of an autonomous driving algorithm to hard brake). As yet another example, a sub-score may correspond to control of the vehicle (e.g., swerving, hard cornering, unintentional or intentional drifting). Many other similar examples exist.

The autonomous vehicle score may be determined over a time period. For example, the autonomous vehicle score may comprise multiple sub-autonomous vehicle scores, each corresponding to a different period of time in which the vehicle 200 was operated. As such, changes in the performance of an autonomous driving algorithm (e.g., changes which arise as various sensors of the vehicle 200 wear out and/or become dirty) may be tracked over time.

The autonomous vehicle score may be stored in, e.g., a database, and may be used for future comparisons. Additionally and/or alternatively, the performance metrics determined in step 303 may be stored for future comparisons. In this manner, a repository of autonomous vehicle scores and/or performance metrics may be developed such that subsequent comparisons (e.g., those described in step 304) may be more robust. For example, by storing a large quantity of performance metrics and/or autonomous vehicle scores for a wide variety of autonomous driving algorithms (and/or vehicles within which autonomous driving algorithms are stored), the comparisons performed in step 304 may provide a more accurate picture In step 306, it is determined if the autonomous vehicle score determined in step 305 satisfies a threshold. The threshold may correspond to a minimum autonomous vehicle score or acceptability threshold, such that the autonomous vehicle score is compared to the threshold in order to determine whether the autonomous driving algorithm 207 is sufficiently safe and/or is performing in a satisfactory manner. If the autonomous vehicle score does satisfy the threshold, the flow chart proceeds to step 309. Otherwise, the flow chart proceeds to step 307.

In step 307, if the autonomous vehicle score did not satisfy the threshold, it is determined whether one or more second driving algorithm(s) are available. The one or more second driving algorithms may be determined using a database of autonomous driving algorithms. The one or more second driving algorithms may be determined by, for example, querying a database to determine autonomous driving algorithms associated with a superior autonomous vehicle score as compared to the autonomous driving algorithm 207. In this manner, the one or more second autonomous driving algorithms may comprise autonomous driving algorithms which operate in a superior and/or safer way as compared to the autonomous driving algorithm 207. If one or more second driving algorithms are available, the flow chart may proceed to step 308. Otherwise, the flow chart proceeds to step 309.

In step 308, if one or more second driving algorithms are available, an indication of the one or more second autonomous driving algorithms may be sent. The indication may, for example, be sent to a computing device associated with the vehicle 200. The indication may be configured to cause the vehicle 200 to install and/or execute the one or more second autonomous driving algorithms. For example, the indication may be configured to cause the vehicle 200 to uninstall the autonomous driving algorithm 207 and install and execute the one or more second autonomous driving algorithms. The indication may comprise an instruction that the vehicle 200 should have the one or more second autonomous driving algorithms installed by, e.g., a technician. In another example, the indication may comprise an instruction that the vehicle 200 be in a non-operating state (e.g., parked with the engine off). The indication may, for example, be displayed on the display device 208 of the vehicle 200.

In step 309, if the autonomous vehicle score satisfies the threshold in step 306 or if the one or more second driving algorithms are determined unavailable in step 307, then the autonomous vehicle score may be sent to a computing device associated with the vehicle 200. Sending the autonomous vehicle score may comprise indicating whether the autonomous driving algorithm 207 is performing in a manner incongruous with a marketed performance capability of the autonomous driving algorithm 207. For example, the autonomous driving algorithm 207 may be marketed as a Level 5 autonomous driving algorithm, but the autonomous vehicle score may indicate that the autonomous driving algorithm 207 is incapable of performing Level 5 driving in an expected manner. In such a circumstance, sending the autonomous vehicle score may comprise transmitting an indication of a difference between the actual performance of the autonomous driving algorithm 207 and the marketed performance of the autonomous driving algorithm 207. Sending the autonomous vehicle score may comprise causing one or more messages to be displayed on, for example, the display device 208 of the vehicle 200.

Sending the autonomous vehicle score may comprise sending, to a computing device associated with the vehicle 200, an indication that the autonomous driving algorithm 207 should not be used. Such a circumstances might arise where, for example, a replacement autonomous driving algorithm is not available, and/or where installation of a replacement autonomous driving algorithm cannot be performed in a reasonably quick manner. Sending the autonomous vehicle score may additionally and/or alternatively comprise sending the autonomous vehicle score to an external server, such as a server associated with a ratings service.

Figure 4:
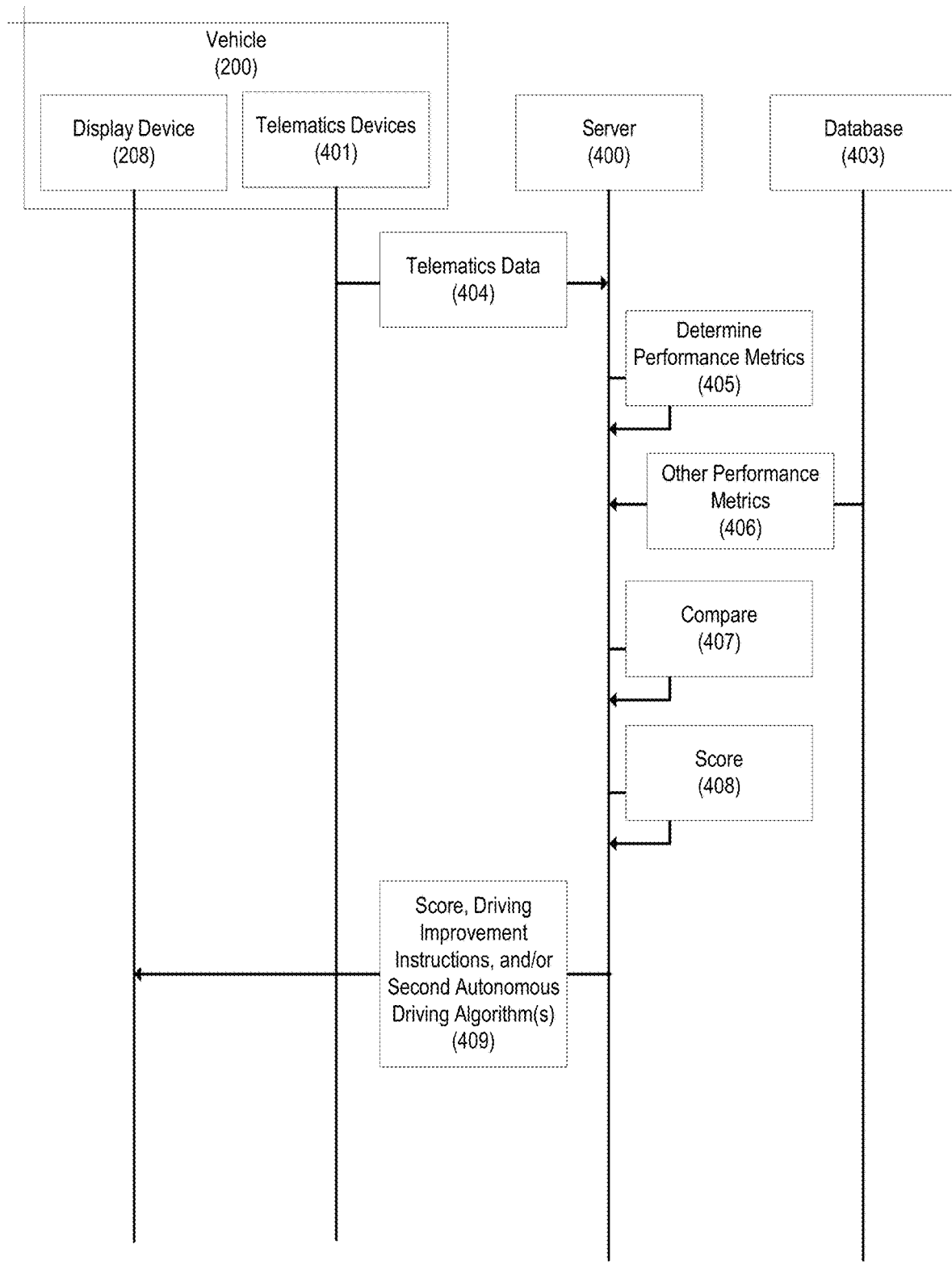
FIG. 4 is an event sequence which shows an example series of steps which may be taken by a server in accordance with one or more aspects described herein.

FIG. 4 is an event sequence which shows an example series of steps which may be taken by a server 400 in accordance with one or more aspects described herein. The server 400 may be any computing device which may perform steps, such as those shown in FIG. 3, and may be any one of the computing devices discussed with reference to FIG. 1. The telematics devices 401 may comprise any telematics devices of the vehicle 200, including any one or more of the telematics devices 209 shown in FIG. 2. A database 403 may be communicatively coupled to the server 400 and may store information, such as performance metrics and/or autonomous vehicle scores, whether determined by the server 400 or otherwise.

In step 404, the telematics devices 401 may transmit telematics data to the server 400. This step may correspond to step 301 of FIG. 3. In step 405, the server 400 may determine performance metrics. This step may be the same or similar as step 303 of FIG. 3. In between steps 404 and 405, other steps, such as step 302 of FIG. 3, may be performed.

In step 406, the server 400 may receive, from the database 403, one or more other performance metrics. The one or more other performance metrics may correspond to one or more autonomous driving algorithms, drivers, ideal driving performance, or the like. The performance metrics received in step 406 may, but need not, have any similarity to the performance metrics determined in step 405. For example, the performance metrics in step 405 may correspond to an autonomous driving algorithm, and the performance metrics received in step 406 may be idealized performance metrics, may correspond to a real driver (e.g., without the aid of an autonomous driving algorithm), or the like.

In step 407, the server 400 may compare the performance metrics from step 405 and the performance metrics from step 406. This may be the same or similar as compared to step 304 of FIG. 3. In step 408, the server 400 may generate an autonomous vehicle score based on the comparing in step 407. This may be the same or similar as compared to step 305 of FIG. 3.

In step 409, the autonomous vehicle score from step 408 and/or one or more second autonomous driving algorithms may be sent to the display device 208 of the vehicle 200. Step 409 may be the same or similar as step 308 and/or step 309 of FIG. 3. As described with respect to step 308 of FIG. 3, the server 400 may send one or more second autonomous driving algorithms to the vehicle 200. And, as described with respect to step 309 of FIG. 3, sending the autonomous vehicle score may comprise causing the display device 208 to show the autonomous vehicle score, show one or more tips for a driver to improve the autonomous vehicle score, or the like.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
   receiving, by a computing device and via telemetry sensors associated with a vehicle, telematics data corresponding to one or more trips taken by the vehicle during a period of time;
   determining one or more first subsets of the period of time based on determining that, during the one or more first subsets of the period of time, the vehicle used an autonomous driving algorithm;
   determining a first performance metric of the autonomous driving algorithm by analyzing one or more first portions of the telematics data corresponding to the one or more first subsets of the period of time;
   determining one or more second subsets of the period of time based on determining that, during the one or more second subsets of the period of time, the vehicle did not use the autonomous driving algorithm;
   determining a second performance metric of the autonomous driving algorithm by analyzing one or more second portions of the telematics data corresponding to the one or more second subsets of the period of time;
   comparing the first performance metric to the second performance metric; and
   assigning, based on the comparing, a score to the autonomous driving algorithm.

2. The method of claim 1, further comprising:
   sending, to a second computing device associated with the vehicle and based on determining that the score satisfies a threshold, an indication of a second autonomous driving algorithm that has a greater score as compared to the autonomous driving algorithm.

3. The method of claim 1, further comprising:
   sending, to a second computing device associated with the vehicle and based on determining that the score satisfies a threshold, an indication that the autonomous driving algorithm should not be used.

4. The method of claim 1, wherein determining the one or more first subsets of the period of time comprises:
   determining the one or more first portions of the telematics data which indicate human input via one or more controls of the vehicle;
   determining the one or more second portions of the telematics data which indicate control of the vehicle via the autonomous driving algorithm; and
   determining the one or more first subsets of the period of time based on the one or more second portions of the telematics data.

5. The method of claim 1, further comprising:
   determining, based on the score, an autonomous driving level for the autonomous driving algorithm; and
   causing display of an indication of whether the autonomous driving level differs from a second autonomous driving level that was previously assigned to the autonomous driving algorithm.

6. The method of claim 1, wherein determining the first performance metric comprises:
   determining environmental conditions corresponding to the one or more first subsets of the period of time, wherein the first performance metric is based on the environmental conditions.

7. The method of claim 1, wherein the telemetry sensors comprise a smartphone located in the vehicle.

8. The method of claim 1 further comprising:
   comparing the first performance metric with a historical performance metric that corresponds to an older version of the autonomous driving algorithm.

9. The method of claim 1 further comprising comparing the first and second performance metrics with one or more other performance metrics associated with another autonomous driving algorithm, wherein the other autonomous driving algorithm corresponds to a different type of vehicle as compared to the autonomous driving algorithm.

10. A method comprising:
    receiving, by a computing device and via first telemetry sensors associated with a first vehicle, first telematics data corresponding to a first period of time during which the first vehicle was engaged in autonomous driving using a first autonomous driving algorithm;
    receiving, by the computing device and via second telemetry sensors associated with a second vehicle, second telematics data corresponding to a second period of time during which the second vehicle was engaged in autonomous driving using a second autonomous driving algorithm;
    comparing performance metrics of the first telematics data and second telematics data to determine a performance difference between the first autonomous driving algorithm and the second autonomous driving algorithm;
    determining that the performance difference indicates that the second autonomous driving algorithm is safer than the first autonomous driving algorithm; and transmitting, to a second computing device associated with the first vehicle and based on the performance difference, an indication of the second autonomous driving algorithm being safer than the first autonomous driving algorithm, wherein the indication of the second autonomous driving algorithm comprises a prompt to install the second autonomous driving algorithm.

11. The method of claim 10, wherein transmitting the indication comprises:
determining a marketed autonomous driving level of the first autonomous driving algorithm; and
determining, based on the performance difference, that the first autonomous driving algorithm does not meet a threshold associated with the marketed autonomous driving level, wherein the indication of the second autonomous driving algorithm indicates an actual autonomous driving level of the first autonomous driving algorithm.

12. The method of claim 10, wherein the first telemetry sensors comprise a smartphone located in the first vehicle.

13. The method of claim 10, wherein the performance difference corresponds to a quantity of user input required during autonomous driving.

14. The method of claim 10, wherein comparing the performance metrics of the first telematics data and the second telematics data comprises:
comparing a portion of the first telematics data and a portion of the second telematics data based on determining that both portions correspond to similar driving conditions.

15. A method comprising:
receiving, by a computing device and via telemetry sensors located in a vehicle, telematics data corresponding to one or more trips taken by the vehicle during a period of time;
determining one or more subsets of the period of time by:
determining one or more first portions of the telematics data which indicate input by a user; and
determining one or more second portions of the telematics data which indicate control of the vehicle by an autonomous driving algorithm;
determining a first performance metric of the autonomous driving algorithm by analyzing the one or more first portions of the telematics data;
determining a second performance metric of the autonomous driving algorithm by analyzing the one or more second portions of the telematics data;
comparing the first performance metric and the second performance metric to one or more other performance metrics associated with one or more different autonomous driving algorithms;
assigning, based on the comparing, a score to the autonomous driving algorithm;
sending, to a second computing device associated with the vehicle and based on determining that the score satisfies a threshold, an indication of a second autonomous driving algorithm that has a greater score as compared to the autonomous driving algorithm; and
causing the second computing device to install and execute the second autonomous driving algorithm.

16. The method of claim 15, wherein the telemetry sensors comprise a smartphone located in the vehicle.

17. The method of claim 15, wherein at least one of the one or more different autonomous driving algorithms corresponds to a different type of vehicle as compared to the autonomous driving algorithm.

* * * * *